(12) United States Patent
Vieille

(10) Patent No.: US 11,454,745 B2
(45) Date of Patent: Sep. 27, 2022

(54) MULTICHANNEL CLOSE-UP IMAGING DEVICE

(71) Applicant: Depixus, Paris (FR)

(72) Inventor: Thibault Vieille, Paris (FR)

(73) Assignee: Depixus

(*) Notice: Subject to any disclaimer, the term of this patent is extended or adjusted under 35 U.S.C. 154(b) by 0 days.

(21) Appl. No.: 17/059,593

(22) PCT Filed: May 31, 2019

(86) PCT No.: PCT/EP2019/064174
§ 371 (c)(1),
(2) Date: Nov. 30, 2020

(87) PCT Pub. No.: WO2019/229230
PCT Pub. Date: Dec. 5, 2019

(65) Prior Publication Data
US 2021/0208311 A1    Jul. 8, 2021

(30) Foreign Application Priority Data

May 30, 2018 (EP) .................................... 18305664

(51) Int. Cl.
*G02B 3/00* (2006.01)
*G02B 13/24* (2006.01)

(52) U.S. Cl.
CPC .......... *G02B 3/0062* (2013.01); *G02B 13/24* (2013.01)

(58) Field of Classification Search
CPC .... G02B 3/0062; G02B 7/09; G02B 13/0015; G02B 13/0085
See application file for complete search history.

(56) References Cited

U.S. PATENT DOCUMENTS

| RE28,162 E | 9/1974 | Anderson |
| 4,982,222 A | 1/1991 | Rees |

(Continued)

FOREIGN PATENT DOCUMENTS

| EP | 2693252 A1 | 2/2014 |
| WO | 2010136921 A2 | 12/2010 |

OTHER PUBLICATIONS

International Search Report for PCT/EP2019/064174 dated Sep. 23, 2019; 3 pages.

(Continued)

*Primary Examiner* — Alicia M Harrington
(74) *Attorney, Agent, or Firm* — Lerner, David, Littenberg, Krumholz & Mentlik, LLP

(57) ABSTRACT

The present invention relates to a multichannel imaging device and more specifically to a multichannel device wherein each optical channel has at least an optical low-pass angular filter configured to block any light propagating through the optical channel along a direction of propagation having an angle which is greater than a predefined angle $\Theta_L$ relative to the optical axis, the low-pass angular filter comprising at least one planar interface, separating a first material having a first refractive index $n_1$ and a second material having a second refractive index $n_2$, the ratio of the second refractive index over the first refractive index being lower than 1, preferably lower than 0.66.

15 Claims, 3 Drawing Sheets

(56) References Cited

U.S. PATENT DOCUMENTS

| | | | | |
|---|---|---|---|---|
| 5,731,899 A | * | 3/1998 | Meyers | G02B 3/0056 |
| | | | | 359/621 |
| 5,973,844 A | | 10/1999 | Burger | |
| 6,124,974 A | | 9/2000 | Burger | |
| 2005/0270667 A1 | | 12/2005 | Gurevich et al. | |
| 2017/0261650 A1 | * | 9/2017 | Powell | G02B 3/0087 |

OTHER PUBLICATIONS

Voelkel R, Herzig HP, Nussbaum P, Daendliker R, Hugle WB. Microlens array imaging system for photolithography. Optical Engineering. Nov. 1996;35(11):3323-30. XP000638633.

* cited by examiner

MULTICHANNEL CLOSE-UP IMAGING DEVICE

CROSS-REFERENCE TO RELATED APPLICATIONS

The present application is a national phase entry under 35 U.S.C § 371 of International Application No. PCT/EP2019/064174 filed May 31, 2019, which claims priority from European Application No. 18305664.7 filed May 30, 2018, all of which are hereby incorporated herein by reference.

TECHNICAL FIELD

The present invention relates to a multichannel imaging device, aimed at close-up imaging, i.e. imaging an object arranged at close distance as compared to the size of the device.

BACKGROUND OF THE INVENTION

Compact imaging systems for close-up imaging having a large field of view are increasingly used in the fields of industrial vision, quality check, and document imaging, as in laboratory operations such as inspection of clinical samples.

An imaging device for close-up imaging typically comprises an object lens having a large diameter as compared to classic optics, for example comprised 10 mm and 40 mm of diameter, so as to image a field of view corresponding to a surface of about one square centimeter or more. However, this system requires sophisticated and expensive lenses.

U.S. Pat. No. 4,982,222 discloses a system comprising an array of gradient index optical fibers arranged in a row. However, a mechanical transverse scanning of the object by the array is compulsory to record a two-dimensional image. A significant drawback of this system is then a need for a stable mechanical structure for moving the array. Moreover, the gradient index optical fibers are not transparent to UV illumination, limiting their utility in applications such as the observation of UV fluorescent dyes or UV photolithography.

U.S. RE28162 discloses an imaging system comprising a first two-dimensional array of lenses for imaging an object and a second two-dimensional array of lenses. Each lens of the first array is aligned with a respective lens of the second array, so as to form an array of optical channels. The image generated by first array of lenses can then be reconstructed by the second array of lenses. Each array of lenses, referred to as a "lens mosaic", is made by molding a plastic transparent material. A portion of the object can be imaged by each optical channel. A complete large field of view is thus obtained by the addition of the individual images generated by the different channels.

Völkel et al. (Volkel, R., Herzig, H. P., Nussbaum, P., Daendliker, R., & Hugle, W. B., 1996, *Microlens array imaging system for photolithography. Optical Engineering*, 35(11), 3323-3331) discloses a system also comprising superimposed lens arrays but having miniaturized lenses and a lower pitch as compared to the lens array of U.S. RE28162. Each lens of the array is made by melting resist on a glass substrate. A large field of view, corresponding for example to a surface of 20×20 mm², can be imaged with this system, with a resolution of 5 μm.

However, the systems disclosed in U.S. RE28162 and in Völkel et al. are subject to optical crosstalk between adjacent optical channels of the array, leading to image alteration.

In reference to FIG. 1, an optical system of the prior art, corresponding to one optical channel 4, has an optical axis 6 and a first lens 8. The numerical aperture NA of the system is defined by both the wall of the system, which is arranged parallel to the optical axis 6, and by the aperture diaphragm $D_{ap}$. Considering an object point $P_1$ located in the object plane $\Pi_{obj}$, an incident light ray coming from $P_1$, whose propagation direction forms an angle with the optical axis 6 greater than the numerical aperture, is prevented from propagating towards an image plane $\Pi_i$, by the aperture diaphragm $D_{ap}$. Considering an object $P_2$ also located in the object plane $\Pi_{obj}$, an incident light ray coming from $P_2$ whose propagation direction forms an angle with the optical axis 6 greater the angle of an incident light ray when coming from $P_1$, is no longer stopped by the aperture diaphragm but by the wall of the optical system. Thus, the aperture diaphragm $D_{ap}$ acts as a bandpass angular filter while the combination of the aperture diaphragm and the wall defines a true lowpass filter.

Moreover, one usually also limits the field-of-view with a field diaphragm $D_{Fl}$, as can be seen for the optical rays emitted by the object point $P_1$.

In reference to FIG. 2, a microsystem of the prior art comprising lens arrays is subjected to crosstalk between the different optical channels 4. A lens array 16 commonly comprises lenses, for example the first lenses 8, and a substrate 13, commonly made of a transparent material. The lenses can be built on the transparent substrate 13. Contrary to the optical system illustrated in FIG. 1, the optical system illustrated in FIG. 2 has no absorptive walls between the optical channels 4. Considering an object $P_3$ located in the object plane $\Pi_{obj}$, when the light ray emitted by $P_3$ is propagating towards the optical system following an angle with the optical axis 6 lower than a predetermined angle, the light ray propagates through the optical system in the same optical channel 4. For example, under the predetermined angle, a light ray from $P_3$ propagates through the optical channels $ch_0$ and $ch_1$, and the image $P'_3$ of $P_3$ is made on the image plan $\Pi_i$. Over the predetermined angle, as illustrated by the light rays (a), crosstalk occurs when light is propagating through the optical system and an image of $P_3$ cannot be obtained, resulting in an alteration of the total image.

Therefore, optical systems of the prior art usually comprise collimation systems in order to pre-filter, i.e. not emit the light having high angular frequencies at the entrance of the optical system. This solution has several disadvantages; it does not result in a system having a high numerical aperture and is not adapted for imaging objects emitting an isotropic light, such as fluorescent objects (which are often used in biological microscopy).

In reference to FIG. 3, the crosstalk between adjacent optical channels 4 can also be partially limited by adding several diaphragms 15 in and/or over the different lens arrays 16 to partially reconstruct a lowpass filter. This solution is sufficient to remove crosstalk for only for low aperture imaging systems and is not adapted for imaging objects emitting an isotropic light, such as fluorescent objects; the light rays having angular frequencies beyond a predetermined limit are not completely filtered.

SUMMARY OF THE INVENTION

A device for optical close-up imaging has been developed to respond at least partially to the above-mentioned drawbacks of the prior art. The device comprises a two-dimensional array of optical channels, the array having a main plane, each optical channel having an optical axis and being arranged such that the optical axis is perpendicular to the main plane,
each optical channel comprising:
a first lens system comprising at least a first lens,
a second lens system comprising at least a second lens, each lens having an optical axis aligned with the optical axis of the optical channel,
the first lens system and the second lens system being arranged such that a first surface of the first lens is a light entrance surface of the optical channel, and a second surface of the second lens is a light exit surface of the optical channel such that light propagates from the light entrance surface to the light exit surface within the optical channel,
wherein each optical channel has at least an optical low-pass angular filter configured to block any light propagating through the optical channel along a direction of propagation having an angle which is greater than a predefined angle $\theta_L$ relative to the optical axis, the low-pass angular filter comprising at least one planar interface, separating a first material having a first refractive index $n_1$ and a second material having a second refractive index $n_2$, arranged such that light propagating from the light entrance surface to the light exit surface successively propagates through the first material and the second material, the ratio of the second refractive index over the first refractive index being lower than 1, preferably lower than 0.66,
the planar interface being configured to block light propagating through the optical channel in a direction of propagation having an angle which is greater than or equal to a critical angle $\theta_C$ relative to the optical axis, by total internal reflection, $\theta_C$ being greater than or equal to $\theta_L$,
the critical angle $\theta_C$, the distance $z_n$ between the first lens and a nodal plan of the field lens system along the optical axis and the distance xii in the main plane between the center of a first lens and a border of an adjacent optical channel being such that:

$$z_n = x_{1I}/\tan(\theta_c),$$

the distance between the first lens and the first planar interface being lower than $z_n$.

In further optional aspects of the invention:
the first refractive index is equal to a refractive index of a material of one of the lenses,
the second material is a gas, preferably air,
the array of optical channels comprises superimposed lens arrays, at least one of the lens arrays comprising a transparent substrate and a plurality of lenses in contact with the transparent substrate,
the substrate has a planar surface delimiting the planar interface,
the at least one planar interface comprises a first planar interface arranged between the first lens system and the field lens system,
the at least one planar interface comprises a second planar interface arranged between the field lens system and the second lens system,
each optical channel 6 has a radius and wherein the first lens system 7 has a first object focal plane and a numerical aperture such that an image of the object generated by the first lens system in the first image plane is smaller than the radius of the optical channel 6,
the optical low-pass angular filter comprises at least one diaphragm in contact with the first surface,
the optical low-pass angular filter comprises at least one diaphragm arranged between the first lens system and the field lens system and/or in the field lens system and/or between the field lens system and the second lens system, and/or between the first lens system and the second lens system.

Another aspect of the present invention is a use of the previously described device for optically imaging at least a part of an object, wherein the object is emitting a light at a wavelength $\lambda$ and wherein the lowpass angular filter comprises at least one planar interface, separating a first material having a first refractive index and a second material having a second refractive index, the second material having a thickness measured along the optical axis, comprised between $3\lambda$ and $30\lambda$, preferably between $4\lambda$ and $15\lambda$.

Another aspect of the invention is a method of manufacturing the previously described device, comprising at least a step of stacking a first lens array comprising the first lenses, a second lens array comprising the second wherein at least two of the arrays of lenses are separated by a spacer so as to leave a gap between the two arrays of lenses.

BRIEF DESCRIPTION OF THE DRAWINGS

The invention will be described by way of example, with reference to the accompanying drawings in which.

DETAILED DESCRIPTION OF PREFERRED ASPECTS OF THE INVENTION

General Architecture of the Device

Figure 4:
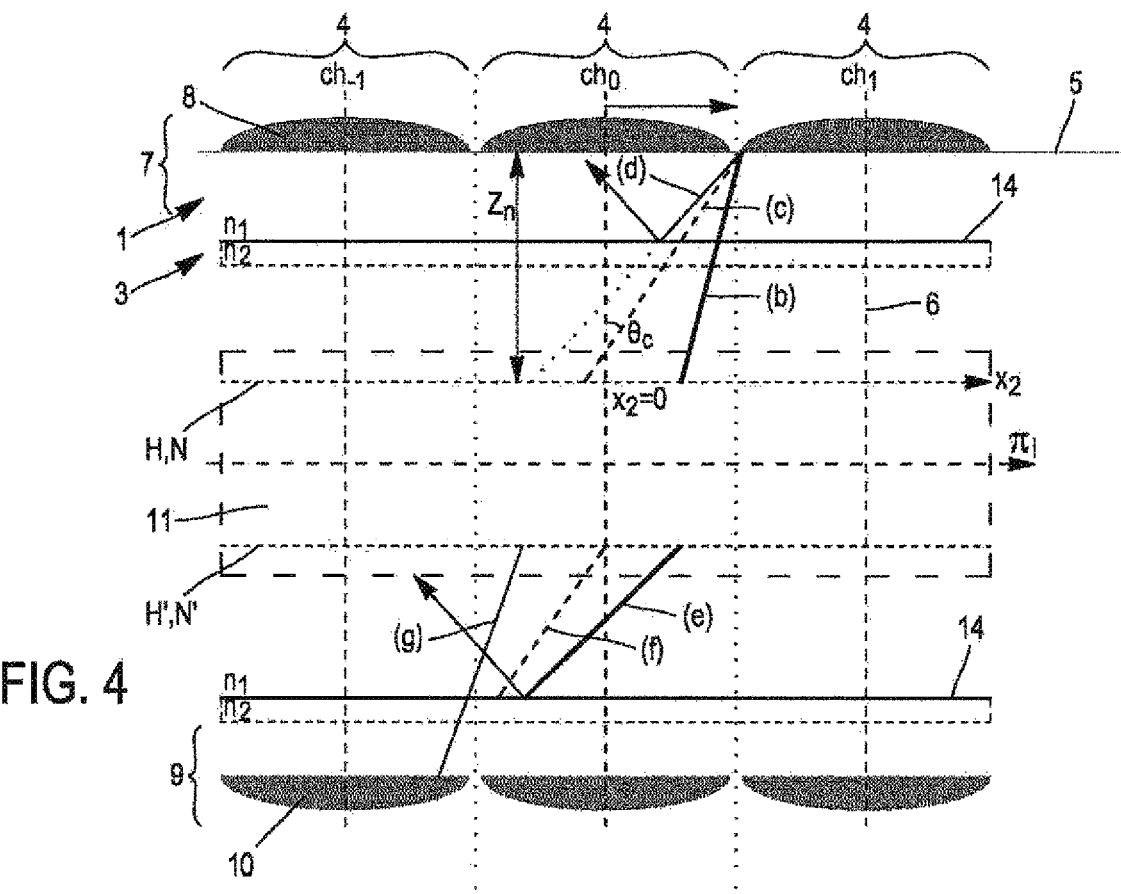
FIG. 4 illustrates a multichannel close-up imaging device comprising planar interfaces, according to a possible embodiment of the invention.

Referring to FIG. 4, the device 1 comprises a two-dimensional array 3 of optical channels 4. FIG. 4 is a section view of the array 3 following the main plane 5, illustrating three successive optical channels 4, respectively $ch_{-1}$, $ch_0$ and $ch_1$.

Figure 5:
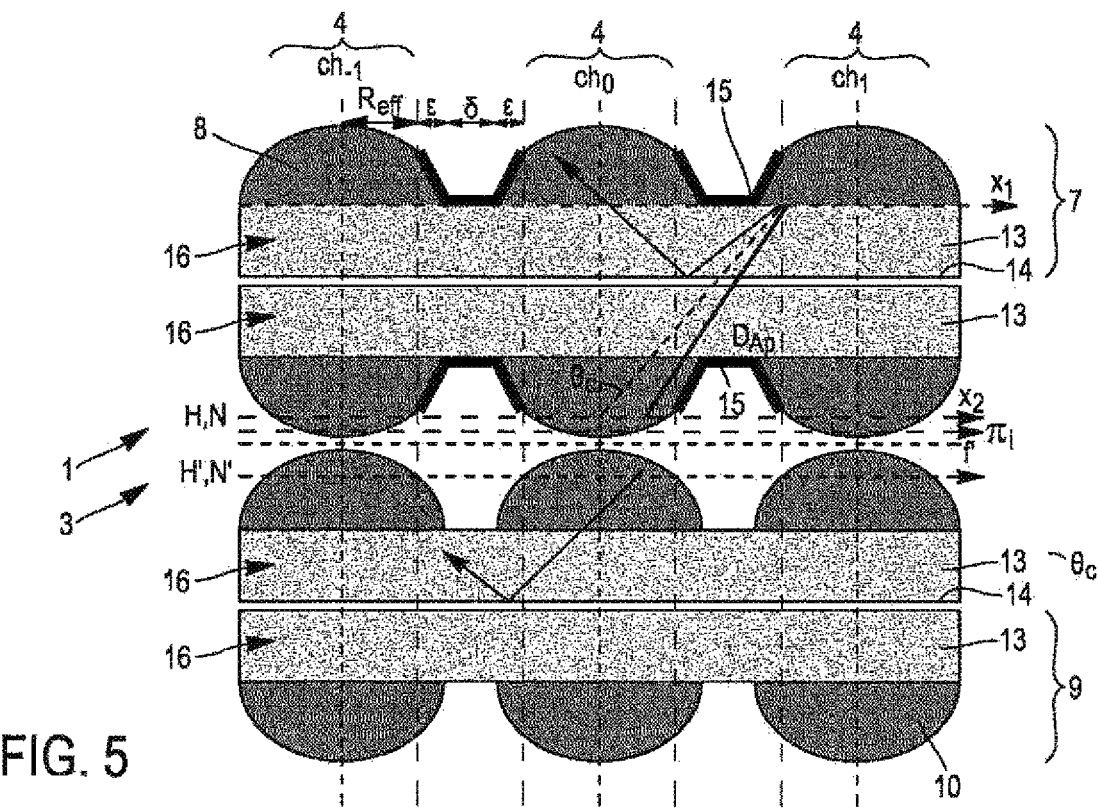
FIG. 5 illustrates a multichannel close-up imaging device comprising planar interfaces and diaphragms, according to a possible embodiment of the invention.
Figure 6:
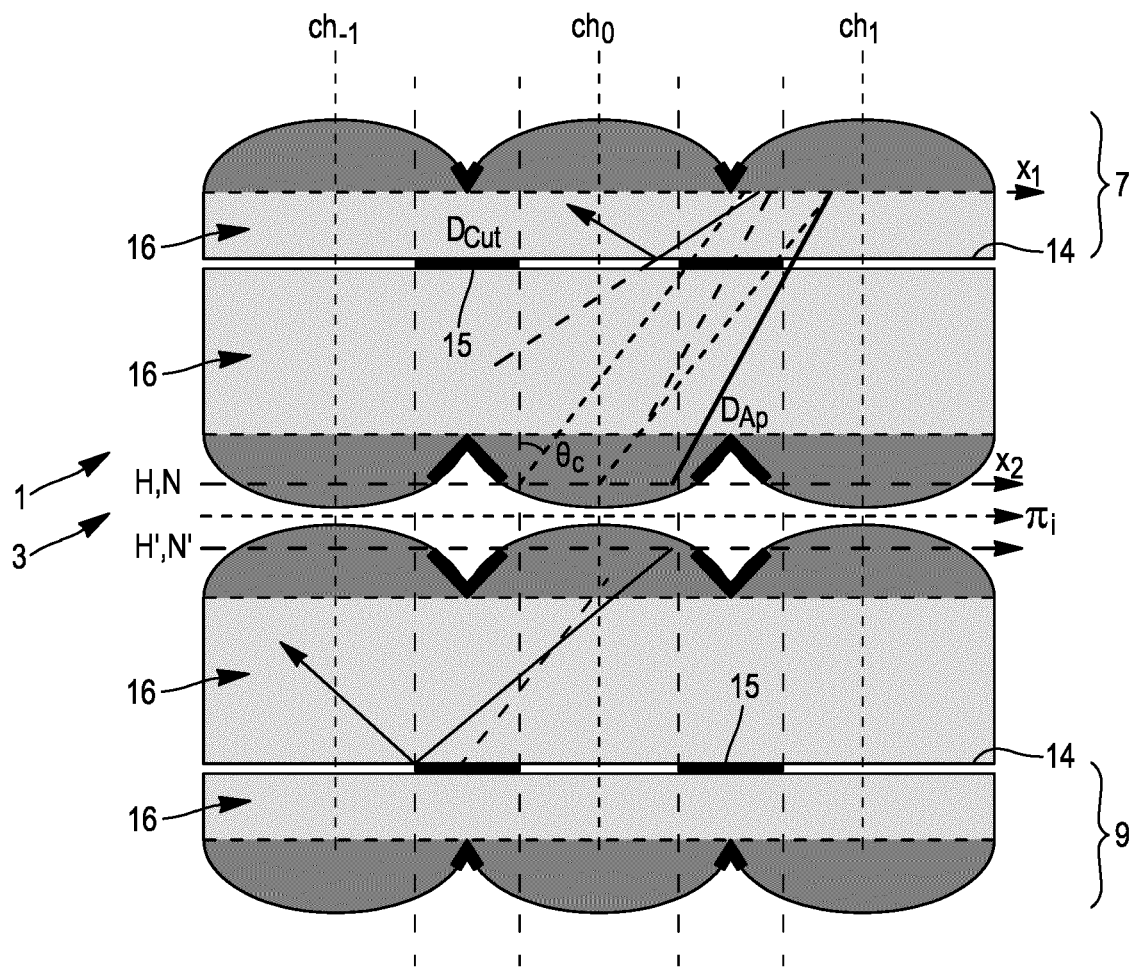
FIG. 6 illustrates a multichannel close-up imaging device comprising planar interfaces and diaphragms, according to a possible embodiment of the invention.

Each optical channel 4 has an optical axis 6. Every optical channel 4 is arranged such that the optical axis 6 is perpendicular to the main plane 5. The optical channels 4 of the array 3 can be arranged in a lattice, notably a periodic squared lattice, a linear lattice, and/or preferably hexagonal lattice. Borders of the optical channels 4 are illustrated in FIGS. 4, 5 and 6 by vertical dotted lines. The borders of two neighbor optical channels 4 can match or can be separated, for example when the device comprises diaphragms and/or when a portion of the lens is masked.

Two neighbor optical channels 4 can be in contact with each other, or separated by a distance $\delta+2\varepsilon$.

Each optical channel 4 comprises a first lens system 7, comprising at least a first lens 8. A first surface of the first lens is a light entrance surface of the optical channel. A first lens system 7 is aimed at forming an intermediate image of the object in the device 1, at an image plan R. The first lens system 7 can also comprise a plurality of first lenses 8. The advantage of a first lens system 7 comprising a plurality of first lenses 8 can be a reduction of the overall focal length of the first lens system 7 and/or an improvement of the numerical aperture of the first lens system 7, which can ease the removal of cross-talk, and/or an adaptation of the working distance of the device 1 to downsize the device 1, and/or an improvement of the image quality by compensation of optical aberration.

Each optical channel 4 comprises a second lens system 9, comprising at least a second lens 10. A second surface of the second lens is a light exit surface of the optical channel. Light propagates from the light entrance surface to the light exit surface within the optical channel. The second lens system 9 is aimed at forming the final image of the object out of the device 1. The second lens system 9 can also comprise a plurality of second lenses 10. The advantage of a second lens system 9 comprising a plurality of first lenses 10 can be a reduction of the overall focal length of the first lens system 9 and/or an improvement of the numerical aperture of the first lens system 9, which can ease the removal of cross-talk, and/or an adaptation of the working distance of the device 1 to downsize the device 1, and/or an improvement of the image quality by compensation of optical aberration. Preferably, the second lens system 9 can be aimed at reconstructing the final image. Preferably, each optical channel 4 further comprises a field lens system 11, at least comprising a field lens. The field lens system 9 can be aimed at manipulating the light within the device 1 for tuning the different parameters of the final image. The field lens system 11 can also be aimed at manipulating the light within the device 1 to avoid optical effects perturbating the final image, such as vignetting. The field lens system 11 can be at least partially defined by principal planes H and H' and by nodal planes N and N' (principal plane H and nodal plane N being illustrated in FIG. 4 by the same dashed direction $x_2$, and principal plane H' and nodal plane N' being illustrated by another dashed direction, parallel to $x_2$).

The device 1 has at least one low-pass angular filter, and preferably at least two low-pass angular filters. The angular filter(s) are configured to block any light propagating through the optical channel 4 along a direction of propagation having an angle which is greater than a predefined angle $\theta_L$ relative to the optical axis 6. The low-pass angular filters comprise(s) at least a planar interface 14 separating a first material having a first refractive index $n_1$ and a second material having a second refractive index $n_2$, the ratio of the second refractive index over the first refractive index being lower than 1, preferably lower than 0.66, so that the light arriving at the planar interface 14 in a said optical channel 4, for example from another optical channel 4, is reflected by the planar interface 14. The first material and the second material are arranged such that light propagating from the light entrance surface to the light exit surface successively propagates through the first material and the second material. Preferably, the second material is a gas and preferably air. Therefore, as gas has a low refractive index, the contrast of refractive index between the first material and the second material can be maximized and the critical angle can be minimized.

Therefore, a light arriving at a planar interface 14 along a direction of propagation having an angle which is greater than the critical angle $\theta_c$ relative to the optical axis is reflected by the planar interface 14 by total internal reflection. The relation between the critical angle $\theta_c$, the first refractive index $n_1$ and the second material having a second refractive index $n_2$ is given from the Snell-Descartes relation, by $\theta_c \geq \theta_L = \arcsin(n_1/n_2)$.

The critical angle $\theta_c$ can be chosen depending on the geometry of each optical channel 4, so as a light propagating through the device 1 with an angle relative to the optical axis 6 involving a crosstalk is reflected by the planar interface 14.

FIG. 4 illustrates a device 1 comprising a low-pass angular filter comprising two planar interfaces 14. The device 1 can comprise two planar interfaces 14. A first planar interface 14 can be arranged between the first lens system 7 and the field lens system 11. A second planar interface 14 can be arranged between the field lens system 11 and the second lens system 9, both planar interfaces 14 separating the first material having the first refractive index $n_1$ and the second material having the second refractive index $n_2$.

Two different typical crosstalk optical rays are illustrated. The optical rays illustrated in dashed lines (c) and (f) have respectively a critical angle $\theta_c$ with the optical axis 6 at the first planar interface 14 located between the first lens system 7 and the field lens system 11, and with the optical axis 6 at the second planar interface 14 located between the field lens system 11 and the second lens system 9.

The optical ray (b) has an angle lower than the critical angle of the first planar interface 14: it is not stopped and propagates through the device 1 towards the second planar interface 14. After propagating through the field lens system 11, the optical ray (b) becomes the optical ray (e) and has an angle relative to the optical axis 6 which is greater the critical angle of the second interface 14. A crosstalk in the rest of the device 1 is avoided by a total internal reflection of ray (e) at the second planar interface 14.

The optical ray (d) has an angle greater than the critical angle of the first planar interface 14. A crosstalk of the optical ray (d) is avoided by a total internal reflection of the optical ray (d) on the first planar interface 14.

The optical ray (g) would be the propagated optical ray (d) had it not been filtered before the field lens system 11.

The first planar interface 14 can be arranged in a plane parallel to the main plane 5, at a distance of the main plane 5 lower than $z_n$, $z_n$ being chosen as parameter of the field lens system so as:

$$z_n = x_{1l}/\tan(\theta_c) \quad (1)$$

$x_{1l}$ being the distance between the optical axis 6 of a given optical channel 4 and the border of an adjacent optical channel 4 along the axis $x_2$, i.e. the distance in the main plane 5 between the center of a first lens 8 and the border of adjacent optical channel 4.

Indeed, in the embodiment illustrated in FIG. 4, two groups of optical rays can be distinguished:

for a given optical channel 4, for example optical channel $ch_0$, wherein $x_2$ is defined as equal to zero at the intersection of the optical axis 6 of the optical channel $ch_0$ and the nodal plane N, the first group of rays comprises the rays coming from the adjacent optical channel 4, for example the optical channel $ch_1$, said rays virtually arriving at the nodal plane N in $x_2$, $x_2$ being lower than 0. The optical rays (d) that becomes (g) after the field lens system 11 is for example part of this group. After propagating through the field lens system 11, the angle of the ray (g) becomes lower than the angle of the ray (d) but also lower than the critical angle, for the same optical channel 4, for example the channel $ch_0$, the second group of rays corresponds to the rays coming from the adjacent optical channel 4, for example the optical channel $ch_1$, said rays arriving at the nodal plane N in $x_2$, $x_2$ being greater than 0. The optical rays (b) which becomes (e) after the field lens system 11 are for example in this group. After propagating through the field lens system 11, the angle of the ray (e) is greater than both the angle of the ray (b) but also than the critical angle $\theta_c$.

Therefore, by designing the device 1 with the condition of the relation (1), the rays of the second group of rays are reflected by the second planar interface 14.

Figure 1:
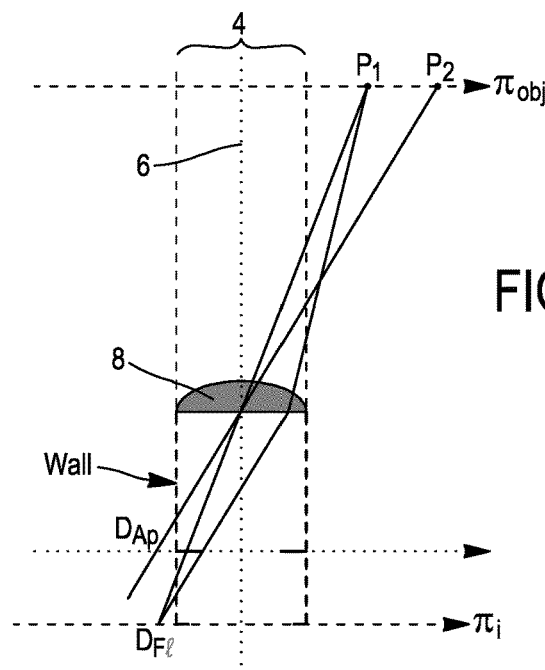
FIG. 1 illustrates a single optical channel of the prior art.
Figure 2:
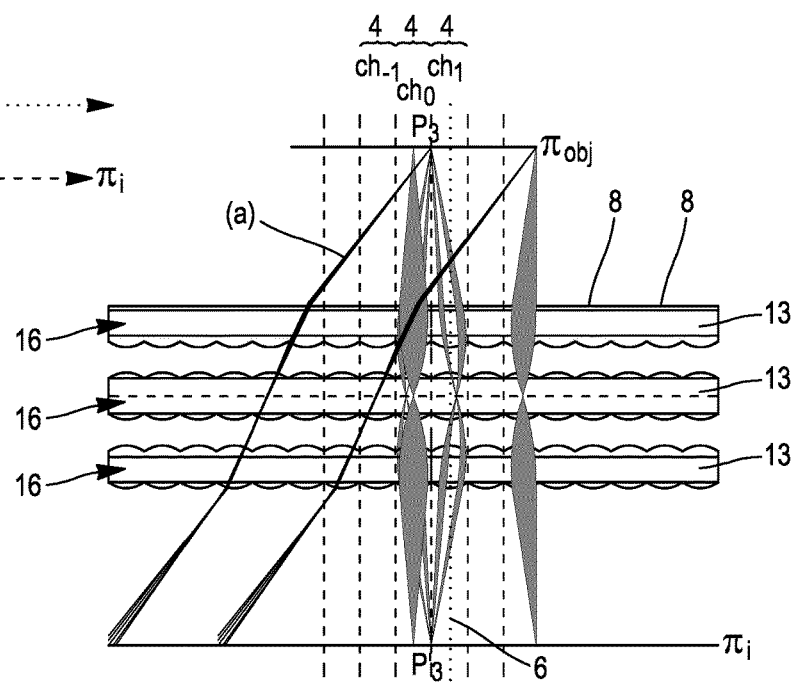
FIG. 2 illustrates a multichannel close-up optical device from the prior art wherein each lens array comprises a transparent substrate,
FIG. 3 illustrate a multichannel close-up imaging device from the prior art comprising diaphragms.
Figure 3:
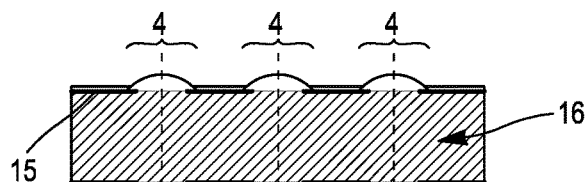
Figure 3:
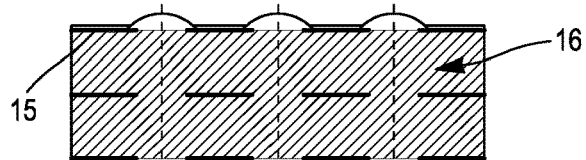
Figure 3:
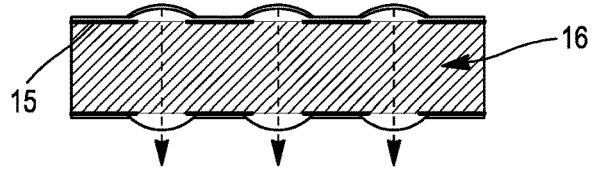

Referring to FIG. 5, the device 1 can comprise at least a lens array 16, which is a two-dimensional array, comprising a transparent substrate 13 and lenses in contact with the transparent substrate 13. Preferably, the refractive index of the transparent substrate 13 is equal to the refractive index of the lenses of the lens array 16. Therefore, an incident optical ray is not deflected by propagating through an interface between the lens and the substrate 13. This structure simplifies the fabrication of the lens array 16. It avoids, for example, an individual mechanical anchoring of the different lenses. However, this lens array 16 structure does not allow for the fabrication of vertical absorptive walls that could prevent crosstalk of optical rays between the optical channels 4, as in the optical channel illustrated on FIG. 1. The substrate 13 can have at least two opposite surfaces: one surface can be in contact with the lenses of the lens array 16, and the other surface delimits the planar interface 14. Therefore, the crosstalk can be avoided by total internal reflection of the optical rays having an angle above the critical angle $\theta_c$ defined by the first material of the substrate 13 and the second material in contact with the substrate 13 at the planar interface 14.

The device 1 can comprise a plurality of lens arrays 16. The array 3 of optical channels 4 can thus comprise superimposed lens arrays 16. Each optical channel 4 thus comprises aligned lenses of each lens array 16.

Diaphragm 15

In addition, the low-pass filter of the device 1 can also comprise at least one diaphragm 15.

The diaphragm(s) 15 can be arranged between the first lens system 7 and the field lens system 11, and/or in the field lens system 11, and/or between the field lens system 11 and the second lens system 9 and/or between the first lens system 7 and the second lens system 9. Referring to FIG. 5, a diaphragm 15 of diameter aperture $D_{AP}$ is arranged in the back focal plane of the first lens system 7. The diaphragm 15 can, for example, define a first lens system 7 numerical aperture of 0.33. Another diaphragm 15 is in contact with the first surface, over a distance δ separating adjacent first lenses 8. This diaphragm can for example be deposited over the surface of the first lens array 16.

Referring to FIG. 6, the angular low-pass filter can preferably comprise a diaphragm 15 arranged between the first lens system 7 and the field lens system 11, notably in contact with the surface of the substrate delimiting the first planar interface 14. The diaphragm 15 has a diameter $D_{cut}$. Therefore, rays having an angle lower than the critical angle but crossing the nodal plane at x greater than 0 are absorbed and consequently filtered. Therefore, this diaphragm 15 can define the angular limit $\theta_c$ of the low-pass angular filter of the device 1.

Numerical Aperture

The numerical aperture NA of the first lens system 7 can be above 0.35, notably comprised between 0.4 and 0.7, and more preferably comprised between 0.45 and 0.6. The numerical aperture NA of the first lens system 7 can be adapted to the numerical aperture $NA_{sys}$ of the overall device 1, below the value NA.

Diameter of the Optical Channel 4 and Diameter of the Lenses 8

The diameter of the first lens 8 can be comprised between 10 μm and 5 mm, notably between 100 μm and 500 μm and preferably between 150 μm and 250 μm. The diameter of the first lens 8 can preferably set the diameter of the optical channel 4, wherein all the lenses can have the same diameter. Diameters of the first lens equal to 200 μm and to 220 μm are respectively illustrated in FIGS. 5 and 6.

Depending on the diaphragm 15 deposited on the first lens array 16, the effective radius $R_{eff}$ of each first lens 8 is within half of the ranges of the first lens 8. The effective radius $R_{eff}$ can be for example equal to 70 μm.

Arrangement of the Lenses of a Lens Array 16

The distance δ between two adjacent first lenses 8 can be comprised between 0 and 300 μm, notably between 0 and 150 μm and preferably between 0 and 50 μm. Therefore, by reducing the distance δ within this range, it is possible to avoid inhomogeneity in the final image and to enhance the contrast of the final image.

First Material and Second Material

Lowering the cut-off angular frequency of the filter of the device 1 can be done be lowering the ratio between the first refractive index and the second refractive index, preferably under 0.66.

Preferably, the first material has a first refractive index greater 1.3, notably greater than 1.4. The first material can be chosen for example from glass, transparent polymer or plastic or any material suitable for lens array fabrication.

Preferably, the second material has a second refractive index lower than 1.2, notably greater than 1.1. The second material can be chosen for example from gas, preferably air.

Considering an object emitting a light at a wavelength λ, the second material can have a thickness measured along the optical axis 6 comprised between 3λ and 30λ, preferably between 4λ and 15λ. Therefore, the thickness of the second material is great enough for avoiding transmission of power by quantum tunneling and is low enough to keep the device compact.

Intermediate Image

The first lens 8 has a first object focal plane and a numerical aperture. Those parameters can be configured so that an image of the object generated by the first lens 8 in the first image plane is smaller than or equal to the diameter of optical channel 4. More generally, the first lens system 7 has a first object focal plane and a numerical aperture such that an image of the object generated by the first lens system in the first image plane is smaller than the radius of the optical channel 6. The object of the optical channel 6 can be for example a portion of the overall object imaged by the device 1, every object of every optical channel 6 comprising the overall object imaged by the device 1. In other terms, any image generated by the first lens system in the first image plane is smaller than the radius of the optical channel 6. Therefore, there is no overlap of the different sub images from different optical channels in the intermediate image plane. The radius of the optical channel 6 can be defined by the radius of the first lens 8 of the optical channel 6, or, when the first lens 8 is covered by a diaphragm, by the radius of portion of the first lens 8 uncovered by the diaphragm.

In a configuration where the first lens system 7 comprises one single lens 8, the working distance WD, i.e. the distance between the object plane and the first lens 8, can be written as:

$$WD = f_1\left(1 - \frac{1}{m_i}\right) \quad (2)$$

with $f_1$ being the focal distance of the first lens system 7, and $m_i$ the intermediate magnification of the first lens system 7.

When the device 1 does not comprise a field diaphragm 15, the radius $y_M$ of the field-of-view of one optical channel 4, i.e. the radius from the point of the object plane on the optical axis 6 to the last point in the object plane from which the first lens system 7 can collect an optical ray for an intermediate image formation, as defined by its numerical aperture $NA_{sys}$, can be expressed as:

$$y_M = NA_{sys} * WD + R_{eff} \quad (3)$$

with $NA_{sys}$ being the sine of the maximal angle $\alpha_{sys}$, $\alpha_{sys}$, being the maximal angle of light that can enter or exit the first lens system 7 to be focused within the optical channel.

Thus, the intermediate image has the radius $y_{M,i}$, defined as:

$$y_{M,i} = m_1 y_M \quad (4)$$

Therefore, the design of the device 1 addresses the inequality (5):

$$y_{M,i} \leq R_{eff} \quad (5)$$

The focal length $f_1$ of the first lens 8 of the first lens system 7 can be expressed as:

$$f_1 = R \sqrt{\frac{1}{NA_1^2} - 1} \quad (6)$$

The distance between the central axis of an optical channel (6) and the border of an adjacent optical channel (4) is defined by:

$$x_{1,i} = R + \delta + \varepsilon \quad (7)$$

$\varepsilon$ being an eventual masking ring thickness defined by a diaphragm 15 deposited on the first lens 8.

Blocking the first group of rays is achieved for:

$$\frac{R + \delta + \varepsilon}{z_n} \geq \tan\theta_l \quad (8)$$

Increasing the pitch by increasing $\delta$ can help filtering the light but decreases the contrast of the image. One can thus help to find a trade-off by adding a diaphragm 15 in contact with a planar interface 14 and preferably in contact with the first planar interface 14. In the optimal case where a diaphragm 15 is placed to avoid high values of $\varepsilon$ and $\delta$, one can place a diaphragm of width w with:

$$w = x_1 - R - \delta/2 - \varepsilon \quad (10)$$

said diaphragm 15 being arranged at the distance $z_D$ from the first lens 8 along the optical axis 6:

$$z_D = \frac{w}{2\tan\theta_c} \quad (11)$$

R, $\varepsilon$, $\delta$ and $z_D$ can be optimized so as to filter the first group of rays with an appropriate cut-off angular frequency. The angle $\theta_2$ of the optical rays of the second group of rays after the refraction by the field lens system 11 is then:

$$\theta_2 = \theta_1 + \frac{x_2}{f_{FL}} \quad (12)$$

$\theta_1$ being the angle of the ray coming from the adjacent optical channel 4 (for example $ch_1$) into the given optical channel (for example $ch_0$), and $x_2$ the coordinate (positive for the second group of rays) of the hitting point of the ray in the nodal plane N of the field lens system 11. The field lens system 11 can comprise an additional second lens array 16, comprising two lens arrays 16 identical to the first lens array 7. Then the focal length of the field length system $f_{FL}$ is:

$$f_{FL} = \frac{f_1}{2}$$

Then:

$$\theta_2 = \frac{x_1}{f_1} + \frac{x_2}{f_1}$$

These rays are then automatically filtered when the rays of the first group are filtered.

The invention claimed is:

1. A device for optically imaging at least a part of an object, comprising a two-dimensional array of optical channels, the array having a main plane,
    each optical channel having an optical axis and being arranged such that the optical axis is perpendicular to the main plane,
    each optical channel comprising:
    a first lens system comprising a first lens, and
    a second lens system comprising a second lens,
    each of the first and second lens having an optical axis aligned with the optical axis of the optical channel,
    the first lens system and the second lens system being arranged such that a first surface of the first lens is a light entrance surface of the optical channel, and a second surface of the second lens is a light exit surface of the optical channel, such that light propagates from the light entrance surface to the light exit surface within the optical channel,
    wherein each optical channel has an optical low-pass angular filter configured to block any light propagating through the optical channel along a direction of propagation having an angle which is greater than a predefined angle $\theta_L$ relative to the optical axis, the low-pass angular filter comprising at least one planar interface, separating a first material having a first refractive index $n_1$ and a second material having a second refractive index $n_2$, arranged such that light propagating from the light entrance surface to the light exit surface successively propagates through the first material and the second material, a ratio of the second refractive index over the first refractive index being lower than 1,
    each optical channel comprising a field lens system, the field lens system comprising at least a field lens arranged between the first lens system and the second lens system along the optical axis of the optical channel, the planar interface being configured to block light propagating through the optical channel in a direction of propagation having an angle which is greater than or equal to a critical angle $\theta_C$ relative to the optical axis, by total internal reflection, the critical angle $\theta_C$ being greater than or equal to the predefined angle $\theta_L$, wherein the critical angle $\theta_c$, a distance $z_n$ between the first lens and a nodal plan of the field lens system along the optical axis, and a distance $x_{1l}$ in the main plane between the center of a first lens and a border of an adjacent optical channel are such that:

$z_n = x_{1l}/\tan(\theta_c)$, and a distance between the main plane and the first planar interface being lower than $z_n$.

2. The device of claim 1, wherein the first refractive index is equal to a refractive index of a material of one of the lenses.

3. The device of claim 1, wherein the second material is a gas.

4. The device of claim 1, wherein the array of optical channels comprises superimposed lens arrays, at least one of the lens arrays comprising a transparent substrate and a plurality of lenses in contact with the transparent substrate.

5. The device of claim 4, wherein the substrate has a planar surface delimiting the first planar interface.

6. The device of claim 1, wherein the at least one planar interface comprises a first planar interface arranged between the first lens system and the field lens system.

7. The device of claim 1, wherein the at least one planar interface comprises a second planar interface arranged between the field lens system and the second lens system.

8. The device of claim 1, wherein each optical channel has a radius and wherein the first lens system has a first object focal plane and a numerical aperture such that any image generated by the first lens system in the first image plane is smaller than the radius of the optical channel.

9. The device of claim 1, wherein the optical low-pass angular filter comprises at least one diaphragm in contact with the first surface of the first lens.

10. The device of claim 1, wherein the optical low-pass angular filter comprises at least one diaphragm arranged between the first lens system and the field lens system and/or in the field lens system and/or between the field lens system and the second lens system, and/or between the first lens system and the second lens system.

11. A method of using the device of claim 1, comprising optically imaging at least a part of an object, wherein the object is emitting a light at a wavelength $\lambda$ and wherein the low-pass angular filter comprises at least one planar interface, separating a first material having a first refractive index and a second material having a second refractive index, the second material having a thickness measured along the optical axis, comprised between $3\lambda$ and $30\lambda$.

12. The device of claim 11, wherein the thickness measured along the optical axis is between $4\lambda$ and $15\lambda$.

13. A method of manufacturing the device of claim 1, comprising stacking a first lens array comprising the first lens and a second lens array comprising the second lens, wherein at least two of the arrays of lenses are separated by a spacer so as to leave a gap between the two arrays of lenses.

14. The device of claim 1, wherein the ratio of the second refractive index over the first refractive index is lower than 0.6.

15. The device of claim 1, wherein the second material is air.

* * * * *